United States Patent [19]

McCray et al.

[11] 4,215,422
[45] Jul. 29, 1980

[54] SELECTIVELY MODIFIABLE PHRASE STORAGE FOR A TYPEWRITER

[75] Inventors: William R. McCray; Edward V. Rutkowski, Jr., both of Lexington, Ky.

[73] Assignee: International Business Machines Corporation, Armonk, N.Y.

[21] Appl. No.: 908,596

[22] Filed: May 22, 1978

[51] Int. Cl.$^2$ .......................... G06F 3/10; G06F 7/02
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 2,283,538 | 5/1942 | Clark | 400/62 |
| 2,717,686 | 9/1955 | Seeber, Jr. | 400/98 |
| 3,260,340 | 7/1966 | Locklar et al. | 400/63 |
| 3,821,710 | 6/1974 | Arciprete et al. | 364/900 |
| 3,864,669 | 2/1975 | Schlickeiser | 364/900 |
| 3,913,721 | 10/1974 | Koplow et al. | 364/900 |
| 3,919,694 | 11/1975 | Fung | 364/900 |
| 4,078,258 | 3/1978 | Lindsey | 364/900 |

OTHER PUBLICATIONS

IBM Technical Disc. Bull., D. Epperly et al., Paging of Text Storage in Random-Accessory Memory, vol. 18, No. 11, Apr. 1976.

*Primary Examiner*—Gareth D. Shaw
*Assistant Examiner*—David Y. Eng
*Attorney, Agent, or Firm*—George E. Grosser

[57] ABSTRACT

Printing operation sequences (e.g. code sequences representing phases of text) entered along with identifier codes by means of typewriter keyboard are stored for selective individual retrieval and may be replaced on an individual basis as the needs of the typewriter operator may dictate. By using a special end loading procedure for adding new sequences, both storage overlapping and build-ups of unused storage locations between sequences are avoided so that storage integrity is maintained while storage usage remains, nonetheless, efficient.

In a preferred implementation, individual sequence retrieval capability is achieved by including in the respective sequences a common delimiter code along with a sequence identifier code. During bulk code transfers that occur when changes are made to the stored sequences, such delimiter and identifier codes are shifted routinely without being distinguished from the sequences they separate.

8 Claims, 6 Drawing Figures

SELECTIVELY MODIFIABLE PHRASE STORAGE FOR A TYPEWRITER

BACKGROUND OF THE INVENTION

1. Field of the Invention

The present invention relates to typewriters in general and, in particular, to typewriters having a capability for storing a plurality of operator supplied phrases for selective playback in response to an operator triggered command signal.

2. Discussion Relative to the Art

It is known to record codes produced by the keyboard apparatus of a typewriter for subsequent retrieval to drive a printing unit. Such capability has been provided, for example, using magnetic or paper tape storage having tracks or positions which may be individually accessed. U.S. Pat. No. 2,717,686 describes a typewriter apparatus that can be preprogrammed to print multiple character combinations in response to depression of respective keys. The memory for such apparatus, however, is not easily loaded by the operator.

With the advent of low cost semiconductor memories it has become feasable to provide for facile storage and recall of commonly used phrases. To justify the expense of implementation, however, the memory dedicated to phase storage must be used in a highly efficient manner and phrase-storage, -recall, and -replacement procedures must be convenient for the operator. Also it would be desirable for implementations using volatile storage to minimize susceptability to loss of the stored phrase information in the event of a temporary loss of power or of an undervoltage condition.

SUMMARY OF THE INVENTION

A typewriter system for allocating a fixed size storage area to a plurality of operator supplied printing-command sequences (e.g. sequences representing text phrases) provides for selective sequence recall or replacement and implements a single-end loading methodology to avoid both overlapping and wasted intersequence spaces. By shifting the sequence selected for replacement to one end and shifting intervening sequences into the vacated locations, expansions and contractions in sequence lengths because of replacements are prevented from disrupting storage allocation to produce other than a series of immediately adjacent subareas.

In a presently preferred implementation, a common delimiter (e.g. an eight bit word of all logic "ones") serves to separate individual sequences into distinct subareas of storage. By using such an embedded delimiter in conjunction with respective sequence identifier words, individual sequences are selectively identifiable yet blocks of ordered sequence information can be shifted to remove embedded unused locations without accounting for changes in the locations of the end points of the individual sequences. (The sequence delimiter merely moves with the phrase as distinguished from the use of pointers that must be meticulously updated during the various phases of storage transfers). Moreover, by marking sequences with a delimiter-identifier combination, a logic processor with very limited mathematical capability administers storage allocation having the sophistication of variable length subareas (sequence areas) that are selectively addressable.

A further advantage to the preferred approach for identifying sequences in storage is that the sequence identities are retained with the sequences in one storage unit which can be isolated and supported by a special standby power source (assuming here a volatile storage) in the event of a temporary loss of power from the normal power supply. This would not be the case if external registers say in a processor were used to store end point addresses for the individual sequences. Such standby capability is significant because a loss of stored sequence information can represent considerable operator time and keyboarding effort.

For added speed of operation the sequence storage is preferrably located adjacent to an area in the same storage which is used for storage of a currently keyboarded line (e.g. for automatic erase). Since such a storage area need not be used during keyboarding of a sequence for selective replay, such adjacency permits the line storage area to, in effect, be appropriated during sequence replacement operations. By appropriating additional working area, enlarged blocks of information may be shifted during sequence storage allocation operations according to the invention with attendant processing time savings.

A presently preferred implementation for the invention will now be described with reference to the drawing wherein.

Figure 1:
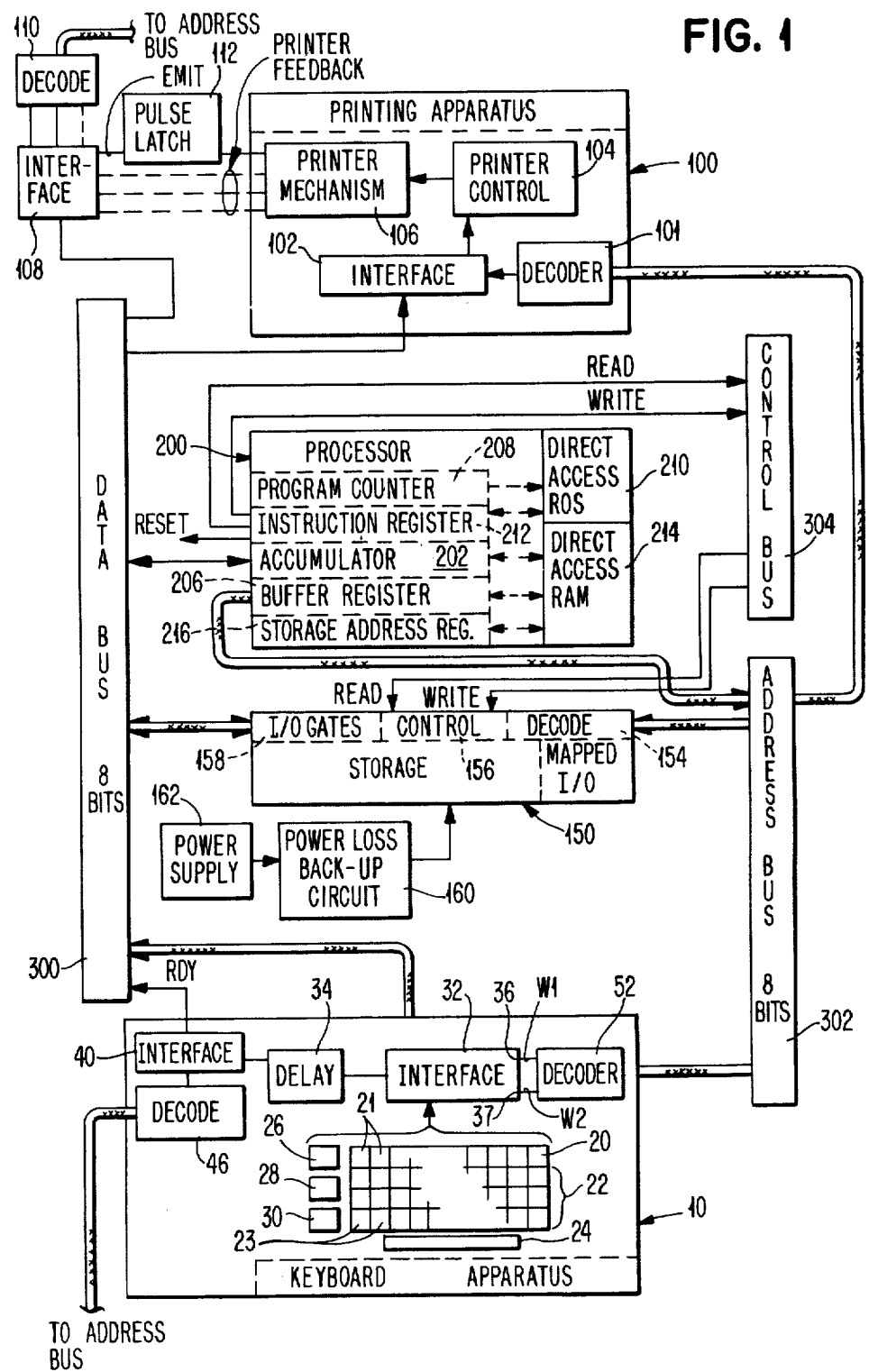
FIG. 1 is a diagram in block form representing an electronically controlled typewriter for use according to the invention.

Referring to FIG. 1, an electronic typewriter suitable for implementation of the invention includes a keyboard apparatus 10 for producing coded signals representative of characters and typewriter functions, a printing apparatus 100 for effecting printing operations in accordance with coded command signals, a read/write storage apparatus 150 for receiving and storing coded signals for subsequent recall, and a processor 200 for responding to keyboard signals to coordinate corresponding storage and printing operations.

The keyboard apparatus is of the modular type known in the art (see e.g. U.S. Pat. No. 3,630,336) and produces coded signals corresponding to respective key actuations. Included in the keyboard apparatus 10 are a key row 20 which includes a set of number keys 21, a series of key rows 22 which include a set of alphabetic keys 23, a space bar 24, a CODE key 26, a DELETE key 28, and a RECORD key 30. Coded signals are produced by depression of individual ones of such keys and by certain key combinations including keys 26, 28 or 30. Such coded signals are supplied for latching at an interface 32 which produces a signal RDY to indicate coded information is ready to be processed. The signal RDY passes through a delay device 34 and is then supplied to an interface device 40 which is connected to a data bus 300. The delay interposed by device 34 causes the RDY signal to be asserted only after any "key bounce" has had time to settle out.

The preferred type of processor 200 includes an eight bit accumulator 202 for use in data transfers and condition tests, and a buffer register 206 to hold intermediate results, comparison data, and address data for accessing the storage 150. A program counter 208 is provided to hold addresses for accessing a direct-access read only storage (ROS) 210 and an instruction register 212 receives ROS data. A direct-access read/write memory 214 is used generally as a "scratch pad" and addresses for such memory are retained in a storage register 216. The processor 200 should be capable of test, compare-branch, branch, load direct, load indirect, store direct, store indirect, increment and decrement operations but need not have further arithmetic capability.

The processor 200 preferrably accesses input/output (I/O) ports using memory addresses (commonly referred to as memory mapped I/O) and is programmed for polling I/O ports on a regular basis as is well known in the art. As a part of such polling, a corresponding address code from buffer register 206 of the processor 200 is established on an address bus 302. Such address code activates a decoder 46 to trigger the interface device 40 for supplying the signal RDY to data bus 300. In response to the signal RDY on data bus 300, the processor 200 accesses an address code from direct-access read only storage (ROS) 210 which address code is applied to the address bus 302. The address code activates a decoder 52 to apply a signal W1 to a first port 36 of interface 32. In response to the signal W1, the interface 32 asserts a keyboard code on the data bus 300. A fixed time after the write command is asserted, the code on the data bus 300 is read into the accumulator register 202 by the processor 200 as is well known in the art.

To limit word size in the presently preferred implementation to eight bits, the code bits from keyboard apparatus 10 are segregated into several blocks which are polled separately. In particular, depression of the code key 26 is indicated in the same code word, say the first word, as are depressions of the keys in rows 20 and 22. A depression of the delete or record key, on the other hand, is indicated in a second word. To access this second word, a second address is employed and decoder 52 is shown having a second signal output (W2) corresponding to such second address. The signal W2 is applied at a port 37 of interface 32. Upon receiving a write command at the port 37, the interface 32 asserts the second code word of the keyboard signal onto data bus 300 for input to the accumulator register 202 of the processor 200.

Upon receiving coded keyboard signals at the accumulator register 202, the processor 200 addresses a corresponding instruction set from the ROS 210. The addressed instructions either initiate a write operation to the printing apparatus 100, or a write operation to a margin and tab storage area 165 of the storage 150, or a write operation involving sequence storage as is discussed in more detail below. If the keyboard command signal corresponds to an actuation of the printing apparatus 100, a printer command code entered in the accumulator register 202 is applied to the data bus 300 in conjunction with assertion of the address of the printing apparatus 100, by a buffer register 206, at the address bus 302. Such assertion of an address code activates a decoder 101 to trigger an interface 102 of the printer apparatus 100 for latching the printer command code from the data bus 300. The latched printer command code is applied from the interface 102 to a printer control 104 to activate magnets and a drive unit (not shown) of a printer mechanism 106 for effecting a printer operation, as is well known in the art. A signal controlled printing unit capable of such modular operation is described in U.S. Pat. No. 3,630,336. For operations of the printer apparatus 100 involving an escapement, a second printer command code is similarly sent from accumulator register 202 through the data bus 300 to the interface 102.

Feedback to the processor 200 regarding operations of the printing apparatus 100 is provided by printer feedback signals, such as an escapement detector signal EMIT, which signals are applied at an interface circuit 108. Such signals are monitored by the processor as a part of the polling procedure mentioned above and are asserted on the data bus 300 by the interface circuit 108 when the processor establishes a corresponding address on address bus 302 to activate a decoder 110. The EMIT signal, represents escapement increments and is preferrably produced by a detector (not shown) of the emitter wheel type discussed with respect to FIG. 2 of U.S. Pat. No. 3,360,336. For the EMIT signal, a pulse latch 112 is provided to extend detector pulse durations to assure coincidence with a polling interval.

Figure 2:
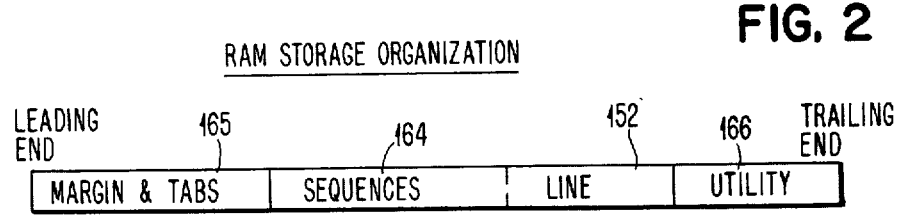
FIG. 2 is a diagram indicating RAM storage organization according to the invention.

As a part of the above-described printing operations, printing apparatus commands are also sent to a read/write storage 150 by asserting addresses on address bus 302 which correspond to a line storage area 152 (FIG. 2). Considering now more specifically the read/write storage 150, a dynamic type of storage is presently preferred to achieve low cost and individual locations in memory are addressed by asserting respective address codes on the address bus 302 which are recognized by a decoder 154. From decoder 154, selection information is supplied to a control section 156 which responds to read or write commands on control bus 304. Transfers of code signals to storage 150 are effected under the control of the control section 156 through a set of I/O gates 158 which are connected to the data bus 300. Assuming a volatile type of storage 150, a power loss backup circuit 160 is indicated in the connection to a power supply 162. Such backup circuit 160 may, for example, be of the type described in U.S. Pat. No. 4,051,945 and serves to prevent loss of stored information as a result of a short term power loss or low voltage condition.

Referring again to FIG. 2, the ordered sequence of locations in the storage 150 starts at a leading end and extends to a trailing end. Groupings of the ordered locations representing storage areas are assigned as a margin and tab area 165, a sequence storage area 164, the line storage area 152, and a utility area 166.

In allocating the sequence storage area 164, the invention, as was mentioned above, achieves storage efficiency by "end loading" of operator keyboarded phrases. The presently preferred approach for implementing such storage involves use of special delimiter codes to separate respective operator supplied sequences. Details of this implementation involve five basic operating modes: (1) initialization, (2) phrase search, (3) phrase loading, (4) phrase printing and (5) phrase deletion.

To understand the various interactions involved in implementing these operating modes, it is helpful to consider the processor 200 in light of its ability as a sequential logic device to organize itself to perform a variety of functions and to act as specific different devices in accordance with operator requests keyboarded at the keyboard apparatus 10.

Figure 3:
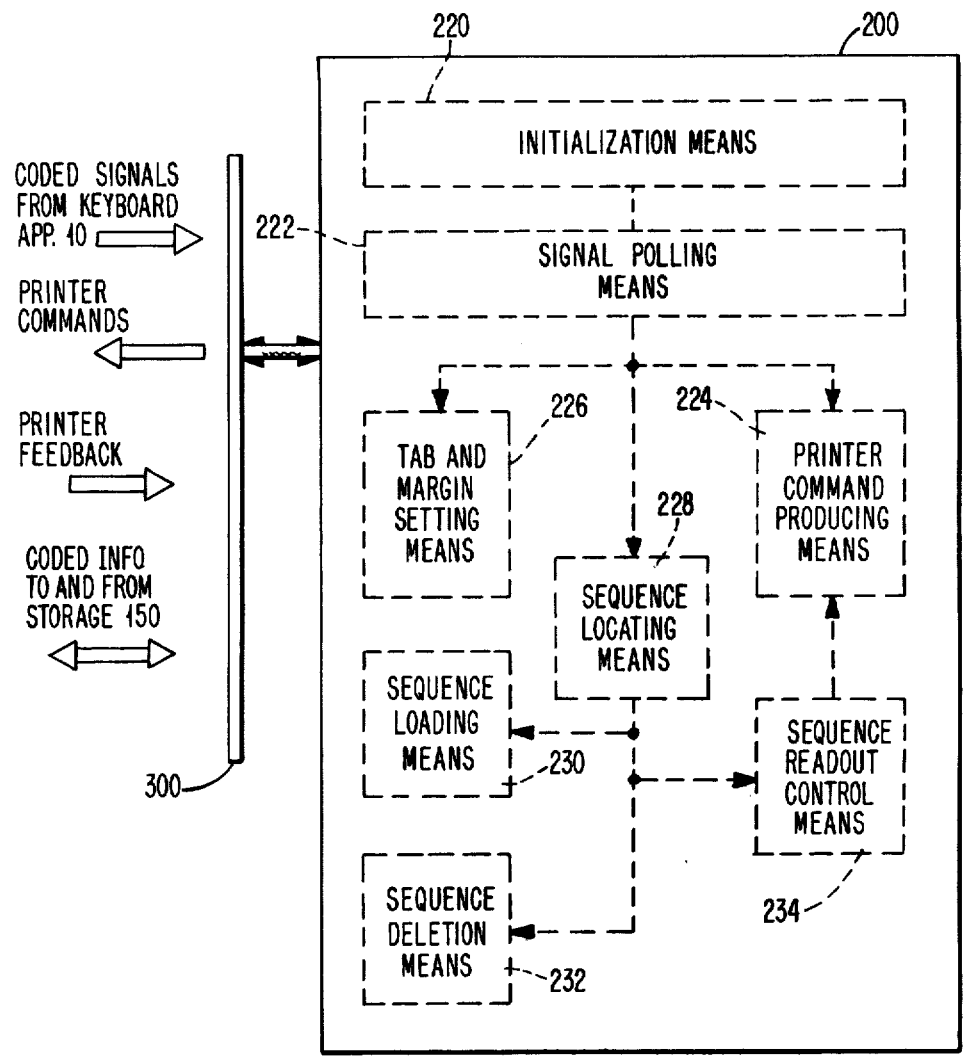
FIG. 3 is a diagram indicating the various device characteristics assumed by the processor in the typewriter system.

Referring to FIG. 3, an initialization means 220, effectively, resides in the processor 200, which means 220 is triggered when power is first supplied to set up various initial states for the storage 150 based on codes stored in the ROS 210. As is discussed more particularly below, the initialization means 220 functions to initialize the sequence storage area 164 (FIG. 2) according to the presently preferred implementation of the invention.

Also effectively resident in processor 200, is polling means 222 which, as was discussed above, implements regular sampling of the signal RDY produced by the keyboard apparatus 10 (FIG. 1) and of the printer feedback signals supplied through the interface 108. In response to the RDY signal the polling means 222 also causes code words to be read into accumulator register 202 from keyboard apparatus 10 as was discussed above.

A printer command producing means 224 responds to most all of the keyboard signals loaded in the accumulator register 202, to access instructions defining printer command signals from the ROS 210 for commanding operation of printing apparatus 100. Such technique is known in the art and will not be covered in further detail here. Those keyboard signals corresponding to tab and margin setting operations call into play a logic sequence for the processor 200 which may be considered as a tab and margin setting means 226. Electronic storage of tab information is also known in the art and being ancillary to the invention is not discussed in detail.

The sequence storage logic may be considered in terms of the modes mentioned above and, in effect, is implemented by the initialization means 220 along with sequence locating means 228, sequence loading means 230, sequence deletion means 232 and sequence readout control means 234 in cooperation with keyboard apparatus 10 and storage 150.

Figure 4:
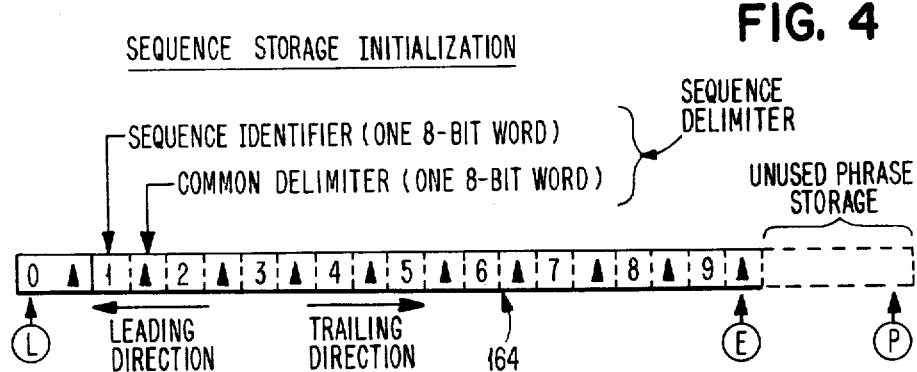
FIG. 4 is a diagram representing the initialization of the sequence storage area.

Referring to FIG. 4 the objective of sequence storage initialization in the preferred implementation is to arrange at the leading end of the sequence storage area 164 a series of sequence delimiters each of which utilizes two eight-bit words of storage (symbols have been used to represent the various types of words of code). The leading end word of a sequence delimiter is a sequence identifier and preferably the same codes produced by corresponding number keys 21 of the keyboard apparatus 10 are used (in actual storage the numerals are, of course, represented in binary). To provide a common test code for detecting the end locations of a sequence, a unique delimiter code is located to one side, preferably the trailing side, of the sequence identifiers (e.g. a delimiter code of eight "ones").

The initialization is realized by preprogramming the series of sequence delimiters in the ROS 210 and then, as a part of the initial power up sequence for the typewriter (e.g. triggered by a closure of the power switch not shown), the processor 200 (FIG. 1) loads such sequence at the leading end of the sequence storage area 164. Such processing requires the processor 200 to have an "indirect load" capability to load the words of the sequence into the accumulator register 202 from the ROS 210 and an "indirect store" capability to load the words from the accumulator register 202 to the storage 150. To generate storage addresses for such data transfers, the processor 200 identifies, from a predefined pointer storage in the ROS 210, the starting address of the delimiter sequence and the address of the leading end of the sequence storage area 164 (denoted by an encircled L). The remaining addresses are then calculated from the accessed addresses utilizing the "register increment" capability of the processor 200. All three of the above-mentioned capabilities are well known for sequential logic devices such as microprocessors.

When the entire sequence is loaded in storage 150, the address of the last location loaded is stored in a pointer storage section of utility storage area 166 as the pointer E (denoted symbolically by the encircled E in FIG. 4). The address contained in pointer E is maintained during other sequence storage operations to indicate the last trailing end location containing sequence codes.

The sequence locating means 228 is triggered as the beginning part of a sequence loading, or sequence deletion or sequence printing operation by keyboard code corresponding to coincident depression of the code key 26 or the delete key 28 or the record key 30 and one of the numerical keys 21. The sequence locate procedure starts at the address stored in the pointer E which, as was mentioned above, identifies the last trailing location containing sequence information. Working address pointers S and N are loaded with the address in pointer E. The pointer S is then decremented until the common delimiter code is matched by the contents of the addressed location, indicating the leading end of a sequence. The associated identifier code (accessed at the location addressed by one further decrement of S the common delimiter) is then checked for a match with the keyboard code of the depressed one of the numeral keys 21. If no match occurs the pointer S is decremented and the pointer N is loaded with the address contained in pointer S. This process is repeated until an identifier code match is achieved whereupon the pointer S is decremented once and the process is terminated. A successful matching situation is indicated symbolically in FIG. 5 for a numeral "1" identifier code where:

L, S, N, E, P, and T represent pointer codes and are positioned to indicate the storage location addresses they contain;

X, Y, and Z represent code words of stored sequences;

Δ, as mentioned above, represents a one word delimiter code which is common to all sequences and is reserved for only delimiting purposes;

1, 2, 3 indicate codes representing numbers (stored as binary words) for identifying respective phrases.

Note: Pointer S identifies the location to the leading side of the sequence leading end points to simplify the logic of other operations for which sequence locating is a prelude.

The organization of the sequence locating means 228 is defined by the above procedure which is implemented using basic "compare-branch", "decrement" "indirect store" and "indirect load" instructions of the processor 200, to generate addresses and compare stored codes.

Figure 5:
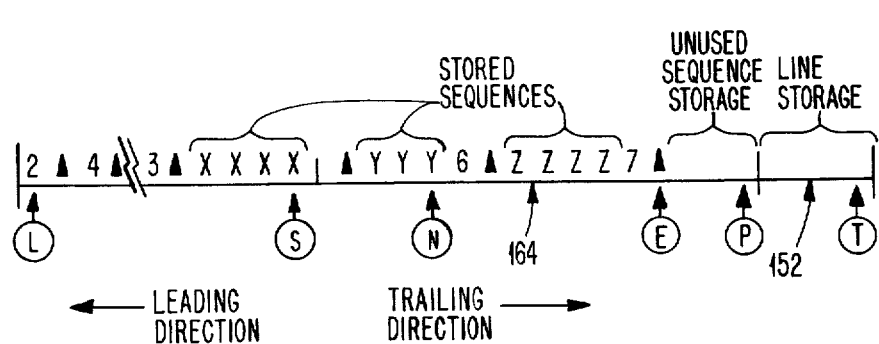
FIG. 5 is a diagram for teaching the use of delimiters and pointers according to a presently preferred implementation for the invention.

For a sequence loading operation, i.e. invoking storage loading means 230, according to the presently preferred implementation of the invention, the operator first depresses the RECORD key 30 in conjunction with depression of one of the numeral keys 21, say the "1" key. The processor 200 responds to the keyboard code by first activating the sequence locating means 228 which establishes the pointers S and N for identifying the locations immediately preceding the leading end and at the trailing end, respectively, of the corresponding sequence in sequence storage area 164 (FIG. 5). The pointers L, P and T represent fixed locations, the leading end of sequence store area 164 the trailing end of sequence storage area 164 and the end of line storage area 152 respectively, and are accessed from the ROS 210. In accordance with a refinement for the invention the line storage area 152 is located adjacent to the sequence storage area 164 and is appropriated during shifting of phrase storage code to permit larger blocks of code to be transferred by sequence loading means 230.

Referring to Table 1 the procedural logic within processor 200 for transferring a sequence to the trailing end of the sequence storage area 164 is described in terms of operations paralleling standard processing instructions.

TABLE 1

| SEQUENCE LOADING LOGIC | | |
|---|---|---|
| STEP 1 | | LOAD (E) INTO B |
| | | LOAD (S) INTO A |
| STEP 2 | | DO WHILE (S) $\neq$ (N) AND (E) $\neq$ (T) |
| | | INCREMENT S |
| | | INCREMENT E |
| | | LOAD ((S)) INTO (E) |
| STEP 3 | | LOAD (E) INTO C |
| | | LOAD (A) INTO E |
| STEP 4 | | REPEAT |
| | 4A | LOAD (S) INTO A |
| | | LOAD (N) INTO S |
| | 4B | DO WHILE (S) $\neq$ (B) AND (E) $\neq$ (A) |
| | | INCREMENT S |
| | | INCREMENT E |
| | | LOAD ((S)) INTO (E) |
| | 4C | LOAD (N) INTO E |
| | | LOAD (S) INTO N |
| | 4D | DO WHILE (E) $\neq$ (A) |
| | | LOAD ((E)) INTO (S) |
| | | DECREMENT S |
| | | DECREMENT E |
| | | UNTIL (N) = (B) |
| STEP 5 | | LOAD (C) INTO E |
| | | LOAD (N) INTO A |
| STEP 6 | | DO WHILE (E) $\neq$ (A) |
| | | LOAD ((E)) INTO (S) |
| | | DECREMENT S |
| | | DECREMENT E |
| | | END |
| LEGEND | | |
| X | | THE STORAGE LOCATION LABELED X |
| (X) | | THE CONTENTS OF LOCATION X OR THE LOCATION ADDRESSED BY SUCH CONTENTS |
| ((X)) | | THE CONTENTS OF THE LOCATION ADDRESSED BY THE CONTENTS OF LOCATION X |

STEP 1 loads the addresses stored in pointers S and E which correspond to one location before the leading end point of the identified sequence and the "in use" storage trailing end point, respectively, of the selected sequence (e.g. sequence 1) in "scratch pad" locations A and B. In step 2 the largest possible block of code for the selected sequence is shifted to the trailing end of the sequence storage area 164 augmented by the line storage area 152. In step 3 the content of pointer E is stored in a scratch pad pointer C and pointer E is loaded to coincide with pointer A to prepare for step 4. STEP 4 involves shifting of codes immediately trailing the residue of the selected sequence ahead of such residue (step 4B) and then shifting the residue into the vacated locations (step 4D). STEPS 4A and 4C set up pointers for steps 4B and 4D, and the entire step 4 is repeated until the residue is immediately to the leading side of the initially transferred segment of the selected sequence.

A repositioning of pointers E and A to coincide with pointers C and N respectively occurs in Step 5. The initially transferred portion of the selected sequence is then shifted ahead of the residue according to Step 6.

Figure 6:
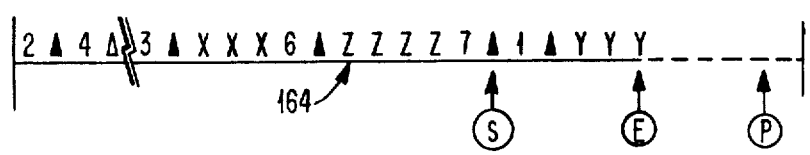
FIG. 6 is a representation of the sequence storage immediately prior to the loading of a new sequence "1" into the sequence storage area.

At the end of the above procedure the selected sequence is at the trailing end of storage and the pointers S and E ientify the addresses of locations immediately leading the leading and trailing end respectively of the selected sequence (See FIG. 6). It will be appreciated that the sequences of operations defined in Table 1 correspond to indirect load, indirect store compare-jump, increment, and decrement operations by the processor 200.

Actual loading of new keyboard codes produced by operator interaction with keyboard apparatus 10 begins with two increments of pointer S to "step over" the sequence delimiter. Each new code, as entered, is loaded using an indirect load to the address indicated by pointer S. After each loading, the pointer S is incremented. When the code for the RECORD key 30 is detected at accumulator register 202, the pointer E is loaded with the address stored in pointer S (to indicate the trailing end of storage in use) and the loading is completed.

Sequence recall and printing by means 234 (FIG. 3) is triggered by depressing CODE key 26 in conjunction with the numeral key 21 corresponding to the desired sequence. First the sequence locating means 228 is activated and sets up pointers S and N to contain the addresses for locations immediately preceding the start and end points respectively of the desired sequence. S is incremented two times to contain the address of the first code word for the sequence and the stored code is loaded one word at a time into the accumulator register 202 for processing by the printer command producing means 224 similar to that for code originating at keyboard apparatus 10. This process continues until the contents of S match the contents of N.

Depression of the DELETE key 28 in conjunction with depression of a numeral key 21 produces a code that triggers a deletion of the corresponding sequence from the sequence storage area 164 (FIG. 2). Sequence locating means 228 is called and sets up pointers S and N for identifying the location immediately preceding the leading end and trailing end respectively of the selected phrase. S is incremented twice to preserve (i.e. avoid overwriting the sequence) delimiter. Pointers S and N are repeatedly incremented and each time the storage content at the location addressed by pointer N is loaded at the location addressed by pointers overwriting the selected sequence. The process continues until N matches the pointer E at which occurance E is loaded with the address contained in pointer S terminating the deletion operation. Such process is implemented for example using the indirect load, the indirect store, and the increment capability of the processor 200 and corresponds to sequence deletion means 232 (FIG. 3).

A sequence storage apparatus for use in a typewriter has been described that provides flexibility regarding sequence length and permits selective recall and replacement of sequences all without introducing storage inefficiency. Moreover by embedding codes for flagging the end points of sequences acording to a presently preferred implementation block transfers of coded information is facilitated and does not require mathematical operations other than increment and decrement by one. Also, in the event of a power loss, necessary information to preserve stored sequences is not dispersed but is resident in the sequence storage area so that only a limited amount of volatile storage need be switched to auxiliary power in a preservation mode of operation.

It should be appreciated that variations and modifications of the invention are possible within the spirit and scope of the invention. For example various types of processors might be employed in allocating storage but generally the processor should provide for indirect load, indirect store, increment, decrement, and compare-jump operations.

Also the leading and trailing end of storage designations can refer to either the a high and low numerical address ends respectively or vice versa.

What is claimed is:

1. A code storage system for a typewriter of the kind having printing apparatus controlled by coded command signals and having keyboard apparatus for producing coded keyboard signals according to operator key and switch actuations, which coded keyboard signals correspond to various typewriter functional and printing operations, said storage system comprising:
    means, actuable by the operator, for producing at least one signal to establish a sequence storage interval and for designating a code sequence identity from a preselected set thereof,
    a read/write storage having an ordered series of addressable locations defining a storage area which extends from a leading end to a trailing end,
    a means for initially storing, toward the leading end of said storage area, delimiters corresponding to the respective sequence identifiers of said preselected set thereof,
    means responsive to said sequence identifying signal for loading codes corresponding to keyboard signals into a storage area of said read/write storage during a storage interval, said loading means including
    (1) means, responsive to stored sequence delimiters, for progressively accessing and for examining the contents of storage locations in one reference direction to identify the addresses of the two end storage locations of a corresponding sequence in the storage area,
    (2) means for shifting in the leading direction any sequence codes residing in locations trailing such identified locations, the source and destination addresses for such codes being defined by logic means that increments the end point addresses of the identified sequence iteratively,
    (3) means responsive to said interval establishing means for receiving codes from the keyboard apparatus during a sequence storage interval and storing such codes in locations adjacent to any shifted code and toward said trailing end, and
    (4) means for including a delimiter at a preselected end of each sequence that is stored, each delimiter including a code individualized to a respective sequence identity.

2. A code storage system according to claim 1 wherein said delimiters include a common delimiter code and an individualized identifier code from a preselected set thereof, and said accessing and examining means locates an identified sequence by accessing codes serially from the storage area which are then compared by first comparison means for signaling a match to the respective identifier code, said first comparison means including means for terminating the accessing of code upon encountering a match.

3. A code storage system according to claim 2 wherein said means actuable by the operator is a first special purpose key which enables individual number keys to identify sequences.

4. A code storage system according to claim 3 wherein a second special purpose key is operator actuable in conjunction with a number key to initiate readout means for serially accessing a sequence having an identity associated with such number key, such readout means being responsive to said stored delimiter codes.

5. A code storage system according to claim 1 wherein said leading end is chosen to be the end having the numerically highest location addresses.

6. A method for efficiently allocating individually addressable locations in storage area among variable-length code sequences which correspond to typewriter printing operations, such sequences being based on code that is supplied from keyboard apparatus along with respective identity codes from a preselected set thereof, and being individually susceptible to replacement by a subsequent sequence associated with the same identifier code, said method comprising:
    loading at one end of the storage area, denoted the leading end, a set of sequence delimiter codes that correspond to respective identity codes from the preselected set;
    establishing a trailing end pointer, based on the storage consumed by said sequence delimiter codes, which pointer identifies the location most remote, according to the storage addressing sequence, from the leading end of such area that contains coded information; and
    serially processing new code sequences from said keyboard apparatus, such processing comprising, (a) detecting the arrival of an identity code from said keyboard apparatus,
(b) searching the storage area, progressively from one end, for the sequence delimiter code corresponding to such detected identity code,
(c) shifting in the leading direction, to occupy locations which contained the identified delimiter and any associated sequence, any codes in locations trailing such locations but not trailing the trailing end location.
(d) loading the new sequence codes along with the corresponding sequence delimiter into trailing locations adjacent to such shifted codes, the delimiter code being located at one preselected end of the sequence and,
(e) loading the trailing end pointer with the address of the last location loaded with code corresponding to the new sequence.

7. The method of claim 6 wherein said shifting involves one code at a time and addresses for the source location and the destination location of successive shifted codes are established by single unit incrementing of a first and a second stored shifted location pointer corresponding to the source and the destination location for said code, respectively.

8. The method of claim 6 wherein the trailing end pointer is loaded into a location in a common storage unit with said storage area whereby power continuity to preserve sequence information is more easily maintained.

* * * * *